(12) United States Patent
Hiratsuka et al.

(10) Patent No.: US 7,068,859 B2
(45) Date of Patent: Jun. 27, 2006

(54) METHOD AND APPARATUS FOR THREE-DIMENSIONAL SIGNAL CONVERSION

(75) Inventors: Seiichiro Hiratsuka, Kitakyushu (JP); Etsuko Satoh, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 611 days.

(21) Appl. No.: 09/984,597

(22) Filed: Oct. 30, 2001

(65) Prior Publication Data

US 2002/0080232 A1    Jun. 27, 2002

(30) Foreign Application Priority Data

Nov. 14, 2000  (JP)  .............................. 2000-346104

(51) Int. Cl.
*G06K 9/32*    (2006.01)
(52) U.S. Cl. ...................... 382/300; 382/167; 358/518; 358/525; 345/606
(58) Field of Classification Search ................ 382/300, 382/167; 358/525, 518; 345/608–610, 598, 345/602, 606
See application file for complete search history.

(56) References Cited

U.S. PATENT DOCUMENTS 5,428,465 A * 6/1995 Kanamori et al. .......... 358/518
5,751,926 A * 5/1998 Kasson et al. .............. 345/419
5,966,474 A * 10/1999 Vondran, Jr. ................ 382/300
6,415,065 B1 * 7/2002 Miyake ...................... 382/300
6,571,010 B1 * 5/2003 Inoue ......................... 382/162

FOREIGN PATENT DOCUMENTS

DE    19945380 A1 * 3/2001
JP    08083330 A * 3/1996

OTHER PUBLICATIONS

R. Bernstein, "Digital Image Processing of Earth Observation Sensor Data", IBM Journal Research & Development, vol. 20, p. 40-57 (1976).

"Theorem for Sampling Steady Random Variables in Multidimensional Space", Institute of Telecommunication Engineers Journal, vol. 42, No. 4, pp. 421-427 (1959).

* cited by examiner

*Primary Examiner*—Joseph Mancuso
*Assistant Examiner*—Dennis Rosario
(74) *Attorney, Agent, or Firm*—Stevens, Davis, Miller & Mosher, LLP

(57) ABSTRACT

A three-dimensional space formed by three-channel input signals is divided into a plurality of polyhedrons having vertices at points corresponding to a conversion table. A particular polyhedron is determined which is associated with the points corresponding to the three-channel input signals. The nonlinear interpolation is carried out using the conversion data corresponding to the vertices of the intended polyhedron thus determined and the conversion data corresponding to the vertices of the polyhedrons in surface contact with the intended polyhedron.

8 Claims, 9 Drawing Sheets

FIG.8

BASIC LATTICE POINT DATA

| AD0, AD1, AD2, AD3 | | | DA0, DA1, DA2, DA3 |
|---|---|---|---|
| Z'' | Y'' | X'' | (X, Y, Z) |
| 0000 0000 0000 | 0000 0000 0000 | 0000 0000 0000 | (0, 0, 0) |
| 0000 0000 0000 | 0000 0000 0000 | 0000 0000 0001 | (1, 0, 0) |
| ... | ... | ... | ... |
| 0000 0000 0000 | 0000 0000 0000 | 1111 1111 1111 | (15, 0, 0) |
| 0000 0000 0000 | 0000 0000 0001 | 0000 0000 0000 | (0, 1, 0) |
| ... | ... | ... | ... |
| 0000 0000 0000 | 1111 1111 1111 | 1111 1111 1111 | (15, 15, 0) |
| 0000 0000 0001 | 0000 0000 0000 | 0000 0000 0000 | (0, 0, 1) |
| ... | ... | ... | ... |
| 1111 1111 1111 | 1111 1111 1111 | 1111 1111 1110 | (14, 15, 15) |
| 1111 1111 1111 | 1111 1111 1111 | 1111 1111 1111 | (15, 15, 15) |

~14

BODY-CENTERED LATTICE POINT DATA

| AD4, AD5, AD6, AD7 | | | DA4, DA5, DA6, DA7 |
|---|---|---|---|
| Z'' | Y'' | X'' | (X, Y, Z) |
| 0000 0000 0000 | 0000 0000 0000 | 0000 0000 0000 | (-0.5, -0.5, -0.5) |
| 0000 0000 0000 | 0000 0000 0000 | 0000 0000 0001 | (0.5, -0.5, -0.5) |
| ... | ... | ... | ... |
| 0000 0000 0000 | 0000 0000 0000 | 1111 1111 1111 | (14.5, -0.5, -0.5) |
| 0000 0000 0000 | 0000 0000 0001 | 0000 0000 0000 | (-0.5, 0.5, -0.5) |
| ... | ... | ... | ... |
| 1111 1111 1111 | 1111 1111 1111 | 1111 1111 1110 | (13.5, 14.5, 14.5) |
| 1111 1111 1111 | 1111 1111 1111 | 1111 1111 1111 | (14.5, 14.5, 14.5) |

~15

METHOD AND APPARATUS FOR THREE-DIMENSIONAL SIGNAL CONVERSION

BACKGROUND OF THE INVENTION

The present invention relates to the signal conversion of three-channel input signals which is carried out, for example, from R (red), G (green) and B (blue) color signals to C (cyan), M (magenta), Y (yellow) and K (black) signals in a color image output device such as a color printer and a color copier.

As a method of converting RGB-color image signals to CMYK-color image signals, the linear masking and the secondary masking improved from the linear masking are known for long. These methods, however, have the insufficient color reproduction accuracy.

What is called the three-dimensional table interpolation method has come to be used frequently in recent years. Many techniques have been proposed as this method.

According to the first technique, a cubic lattice is set in the RGB space of the input signals, and the CMYK value of each lattice point is stored in a memory. The cube is divided into unit cubes having vertices at the lattice points in the RGB space. The unit cube is selected by the most significant bits of the input RGB signals, and the CMYK of the output signals are obtained by the triple linear interpolation from the CMYK values of the eight vertices associated with the selected unit cube.

In the second technique, a cubic lattice is set in the RGB space of the input signals, and the CMYK value of each lattice point is stored in a memory. Each unit cube having vertices at lattice points is divided into tetrahedrons, and a unit cube is selected by the most significant bits of the RGB input signal. From the unit cube thus selected, a tetrahedron is selected based on the least significant bit data, and the color correction values corresponding to the RGB input signals are determined by the linear interpolation of the color correction values of the vertices of the selected tetrahedron.

According to the third technique, a body centered cubic lattice is set in the RGB space of the input signals, and the CMYK value of each lattice point is stored in a memory. The cube is divided into tetrahedrons each having vertices at the lattice points of two adjacent unit cubes. A unit cube is selected by the most significant bits of the RGB input signal, and from the unit cube thus selected, a tetrahedron is selected by the least significant bit data. Then, the color correction values corresponding to the RGB input signals are determined by the linear interpolation of the color correction values of the vertices of the selected tetrahedron.

The three techniques described above involve the linear interpolation including the multiple one, and therefore the interpolation value lacks smoothness as it changes sharply on the surface of the polyhedron making up a unit for interpolation processing. This causes the reduced interpolation accuracy.

As a method of assuring the smooth interpolation even in a polyhedron, the three-dimensional interpolation function for the simple cubic lattice sampling method is disclosed in "Theorem for Sampling Steady Random Variables in Multidimensional Space", Institute of Telecommunication Engineers Journal, Vol. 42 (1959), No. 4, p. 421.

This method, however, poses the problem of the excessive amount of calculations due to the requirement for the considerable number of lattice points.

For simplifying, though two-dimensionally, the interpolation function for square lattices, "Digital image processing of earth observation sensor data", IBM Journal Research & Development, Vol. 20 (1976), p. 40, discloses a method of assuring the smooth interpolation in the boundary lines using the conversion values of the neighboring lattice points by approximating the interpolation function by the tertiary function for each section. This method can be used for the interpolation for the simple cubic lattice easily from the contents described in "Theorem for Sampling Steady Random Variables in Multidimensional Space" cited above.

Nevertheless, the above-mentioned method requires lattice points in the number of 64, i.e. the third power of "4" for the interpolation of one point, and therefore harbors the problem of the increased size of hardware and the longer processing time for software.

SUMMARY OF THE INVENTION

The present invention is intended to solve the above-mentioned problem of the prior art, and the object thereof is to provide a method and an apparatus for three-dimensional signal conversion in which a high-accuracy conversion value for smooth interpolation can be obtained with a small number of lattice points referred to and a small amount of calculations for interpolation processing.

In order to achieve the object described above, according to this invention, there is provided a three-dimensional signal conversion method comprising the steps of:

dividing a three-dimensional space formed by three-channel input signals into a plurality of polyhedrons having vertices at points corresponding to a conversion table;

determining a particular polyhedron to which points corresponding to the three-channel input signals belong; and carrying out nonlinear interpolation using conversion data corresponding to the vertices of the intended polyhedron determined as above and conversion data corresponding to the vertices of adjacent polyhedrons in surface contact with the intended polyhedron.

As a result, a method and an apparatus can be obtained which are capable of high-accuracy three-dimensional signal conversion with a small number of lattice points referred to.

According to one aspect of the present invention, there is provided a three-dimensional signal conversion method capable of high-accuracy three-dimensional signal conversion with a simple configuration for generating different output signals from three-channel input signals by interpolation of a plurality of conversion data, comprising the steps of:

dividing a three-dimensional space formed by the three-channel input signals into a plurality of polyhedrons having vertices at points corresponding to a conversion table;

determining a particular polyhedron to which points corresponding to the three-channel input signals belong to; and carrying out nonlinear interpolation using conversion data corresponding to the vertices of the intended polyhedron thus determined and conversion data corresponding to the vertices of adjacent polyhedrons in surface contact with the intended polyhedron.

The conversion data may be those corresponding to basic-cubic lattice points of the three-dimensional space. Thereby, the three-dimensional signal conversion can be performed at high accuracy with a very simple configuration.

The polyhedron may be a unit cube of the basic-cubic lattice. Thereby the three-dimensional signal conversion can be efficiently performed at high accuracy with a very simple configuration.

The conversion data may be those corresponding to body-centered-cubic lattice points of the three-dimensional space. Thereby, the three-dimensional signal conversion can be performed at high accuracy with a very simple configuration.

The polyhedron may be a tetrahedron having vertices at the body-centered-cubic lattice points. Thereby, the three-dimensional signal conversion can be efficiently performed at high accuracy with a very simple configuration.

According to another aspect of the present invention, there is provided a three-dimensional signal conversion apparatus for generating different output signals from three-channel input signals by interpolation of a plurality of conversion data, comprising:

polyhedron determining means for dividing a three-dimensional space formed by the three-channel input signals into a plurality of polyhedrons having vertices at points corresponding to a conversion table to determine a particular polyhedron to which points corresponding to the three-channel input signals belong;

conversion data read means for reading conversion data corresponding to the vertices of the intended polyhedron thus determined and conversion data corresponding to the vertices of adjacent polyhedrons in surface contact with the intended polyhedron;

weighting-factor calculation means for calculating weighting factors corresponding to the read conversion data based on relative positions of the points corresponding to the input image signal in the intended polyhedron; and nonlinear interpolation means for carrying out nonlinear interpolation using the read conversion data and the weighting factors.

Thereby, the three-dimensional signal conversion can be realized at high accuracy with a very simple configuration.

The conversion data read means may divide the conversion data into a plurality of groups to read the conversion data from the respective conversion data groups in parallel. Thereby, the three-dimensional signal conversion can be realized at high accuracy with a very simple circuit configuration.

The nonlinear interpolation means may include a table for multiplication of the read conversion data and the weighting factors. Thereby, the three-dimensional signal conversion can be realized at high accuracy with a very simple circuit configuration.

BRIEF DESCRIPTION OF THE DRAWINGS

FIG. 8 is a diagram showing a configuration of lattice point data for the method and the apparatus for three-dimensional signal conversion according to the second embodiment of the present invention.

DETAILED DESCRIPTION OF THE EMBODIMENTS

First Embodiment

Embodiments of the present invention will be explained. Assuming that the levels of the RGB color input signals are 256 gradations of "0" to "255" for each color, each color can be expressed in 8 bits.

Figure 1:
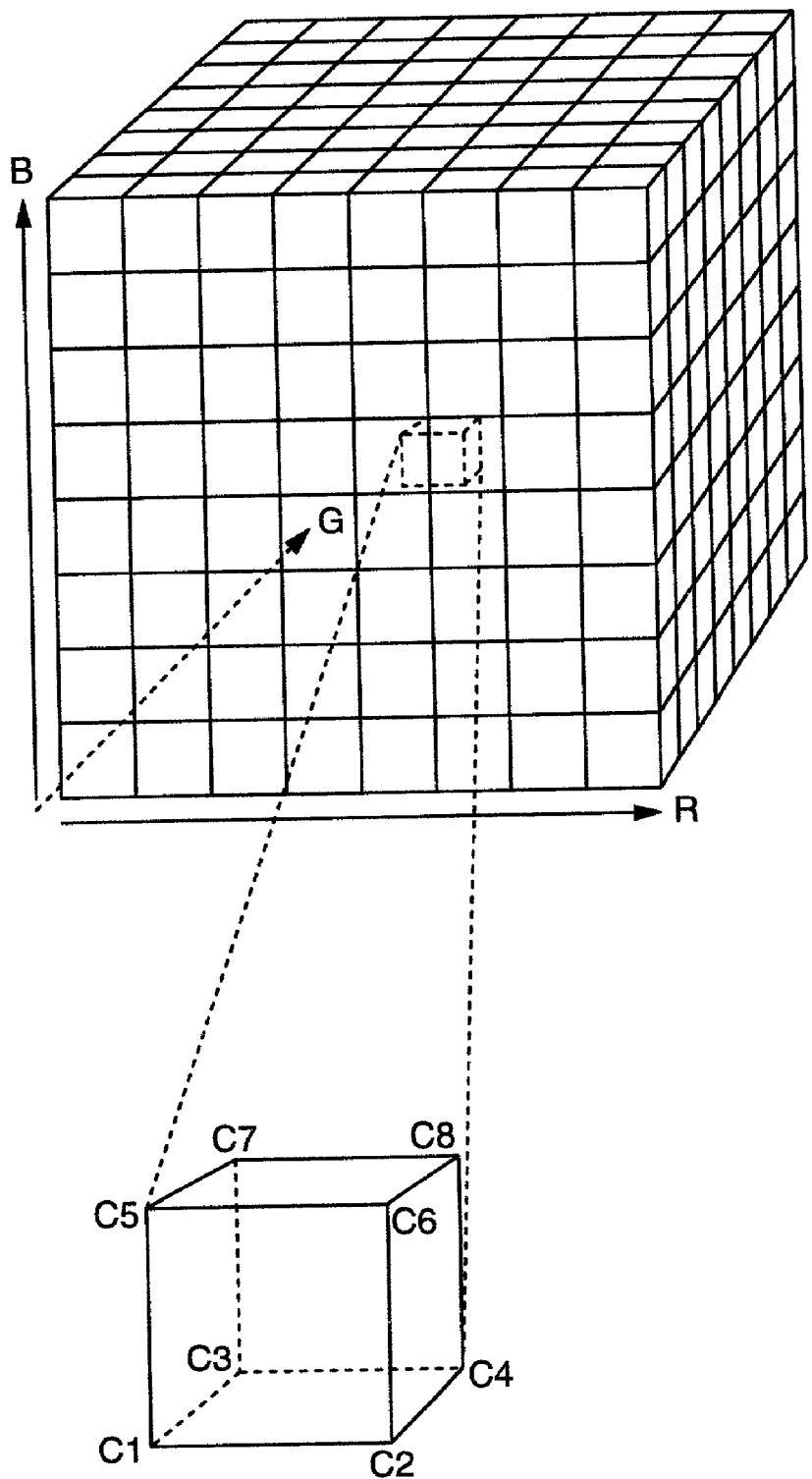
FIG. 1 is a diagram showing a cubic space for a method and an apparatus for three-dimensional signal conversion according to a first embodiment of the present invention.

FIG. 1 is a diagram showing a cubic space for a method and an apparatus of three-dimensional signal conversion according to a first embodiment of the present invention. As shown in FIG. 1, the three-dimensional space formed by the RGB color input signals is divided into eight portions for each 32 levels along each color axis, and thus the whole color space is divided into 512 unit cubes.

Now, assume that the 8-bit RGB signals are expressed as R, G and B, respectively, and are divided into the most significant 3-bits (i.e., r, g, and b) and the least significant 5-bits (i.e., $\Delta r$, $\Delta g$, and $\Delta b$). The unit cube is specified from the values of the most significant 3-bits (r, g, and b), while the least significant 5 bits ($\Delta r$, $\Delta g$, and $\Delta b$) indicate the relative positions of the input signal in the unit cube.

Figure 2:
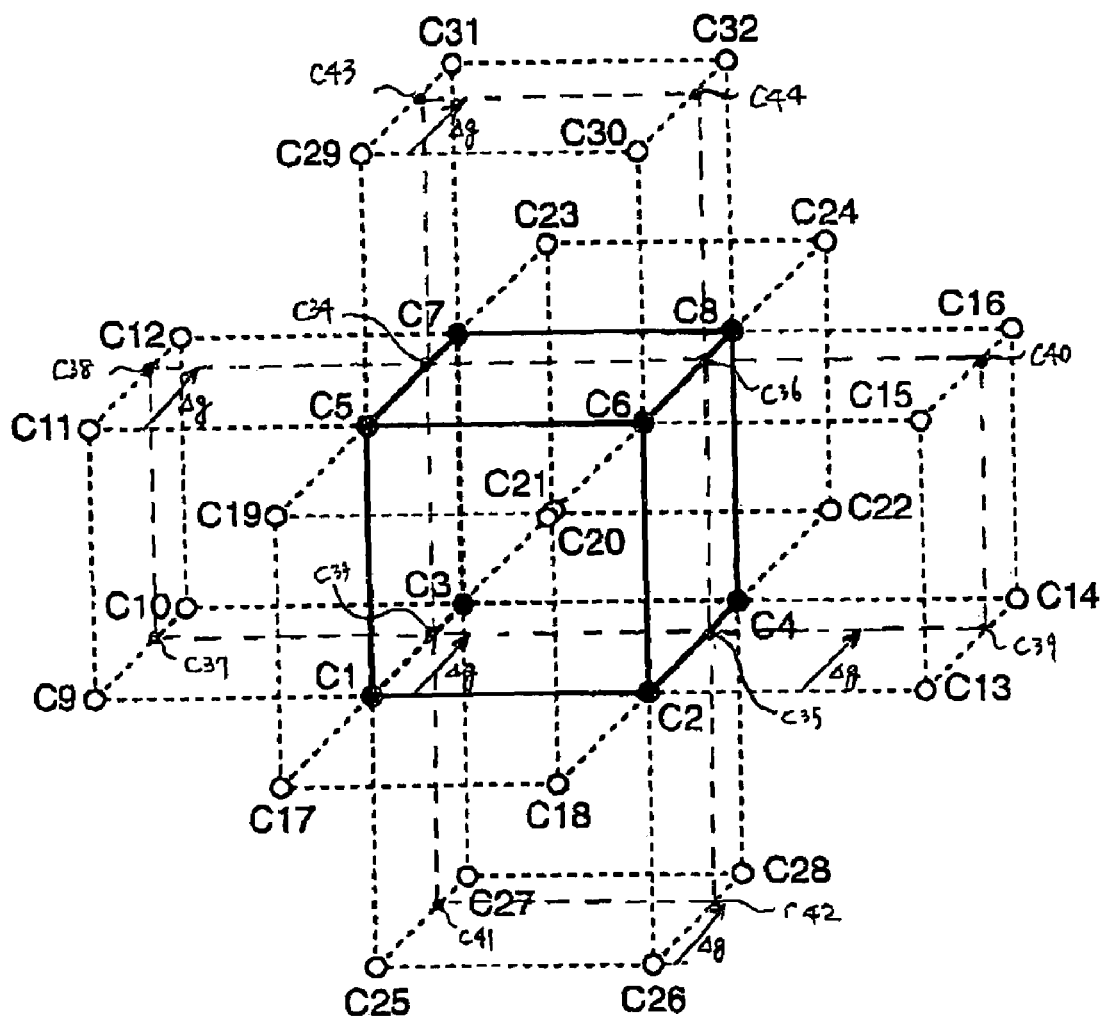
FIG. 2 is a diagram showing cubic lattice points for the method and the apparatus for three-dimensional signal conversion according to the first embodiment of the present invention.

According to the present invention, the conversion data are interpolated using the lattice points of a designated unit cube and the adjacent 6 unit cubes in surface contact with the designated unit cube. FIG. 2 shows such unit cubes and lattice points as illustrated for C (cyan) having the lattice point data C1 to C32.

FIG. 2 is a diagram showing the cubic lattice points in the method and the apparatus for three-dimensional signal conversion according to the first embodiment of the present invention. In FIG. 2, assuming that the points located at the distance $\Delta g$ along the depth from the lattice points C1, C2, C5, C6, C9, C11, C13, C15, C25, C26, C29, and C30 are C33, C35, C34, C36, C37, C38, C39, C40, C41, C42, C43, and C44, respectively, the interpolation values of these points can be expressed by the following equations.

$$C33 = h(w+1)C17 + h(w)C1 + h(w-1)C3 + h(w-2)C21$$

$$C34 = h(w+1)C19 + h(w)C5 + h(w-1)C7 + h(w-2)C23$$

$$C36 = h(w+1)C20 + h(w)C6 + h(w-1)C8 + h(w-2)C24$$

$$C35=h(w+1)C18+h(w)C2+h(w-1)C4+h(w-2)C22$$

$$C37=(1-w)C9+w \cdot C10$$

$$C38=(1-w)C11+w \cdot C12$$

$$C39=(1-w)C13+w \cdot C14$$

$$C40=(1-w)C15+w \cdot C16$$

$$C41=(1-w)C25+w \cdot C27$$

$$C42=(1-w)C26+w \cdot C28$$

$$C43=(1-w)C29+w \cdot C31$$

$$C44=(1-w)C30+w \cdot C32 \quad \text{(Equations 1)}$$

In Equations 1, "w" is $\Delta g/32$, and h(x) is the interpolation function expressed by the following equation as proposed in "Digital image processing of earth observation sensor data" described above.

$$h(t) = \begin{cases} 1-2*|t|^2+|t|^3 & (0 \le t < 1) \\ 4-8*|t|+5*|t|^2-|t|^3 & (1 \le t < 2) \\ 0 & (2 \le t) \end{cases} \quad \text{(Equation 2)}$$

Figure 3:
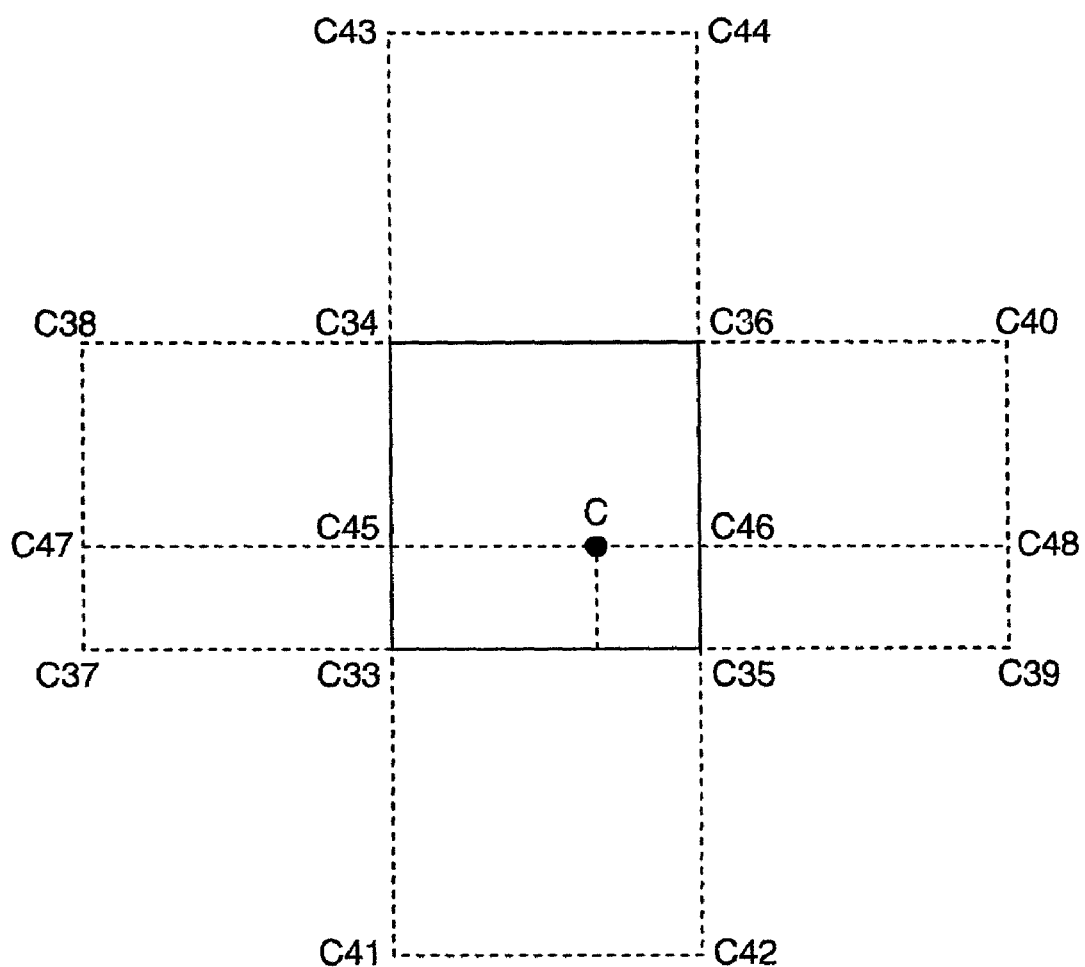
FIG. 3 is a diagram for explaining the interpolation for the method and the apparatus for three-dimensional signal conversion according to the first embodiment of the present invention.

The plane containing these points C33 to C44 is considered as shown in FIG. 3.

FIG. 3 is a diagram for explaining the interpolation in the method and the apparatus for three-dimensional signal conversion according to the first embodiment of the invention. In FIG. 3, assuming that the points located at the distance of $\Delta b$ upward from the lattice points C33, C35, C37, and C39 are C45, C46, C47, and C48, respectively, the interpolation points thereof are expressed by the following equations, respectively.

$$C45=h(v+1)C41+h(v)C33+h(v-1)C34+h(v-2)C43$$

$$C46=h(v+1)C42+h(v)C35+h(v-1)C36+h(v-2)C44$$

$$C47=(1-v)C37+v \cdot C38$$

$$C48=(1-v)C39+v \cdot C40 \quad \text{(Equations 3)}$$

In Equations 3, "v" is $\Delta b/32$.

Further, in FIG. 3, assuming that the target point Cy located at the distance of $\Delta r$ rightward from the lattice point C45, tyhe interpolation point thereof is expressed by the following equation.

$$Cy=h(u+1)C47+h(u)C45+h(u-1)C46+h(u-2)C48 \quad \text{(Equation 4)}$$

In Equation 4, "u" is $\Delta r/32$.

In the way described, the color conversion value C can be determined.

Second Embodiment

Another preferred embodiment will be explained with reference to FIGS. 4–8.

Figure 4A:
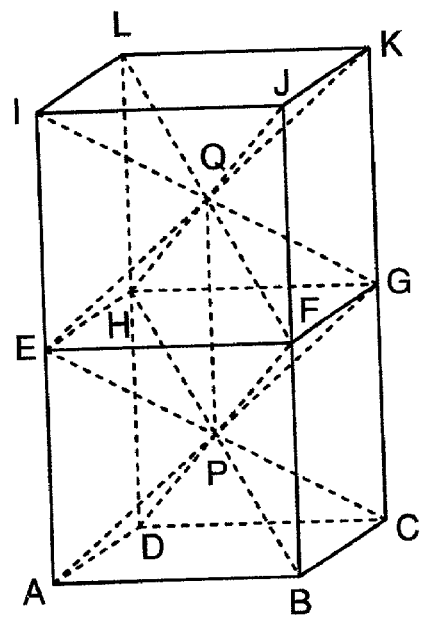
FIGS. 4A–4C are diagrams for explaining a body-centered lattice point and division into tetrahedrons for a method and an apparatus for three-dimensional signal conversion according to a second embodiment of the present invention.
Figure 4B:
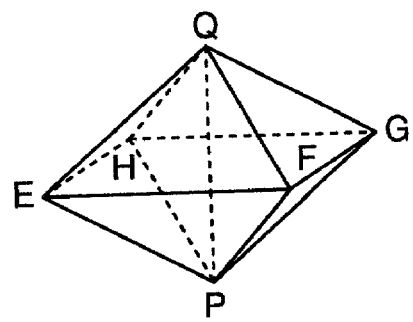
Figure 4C:
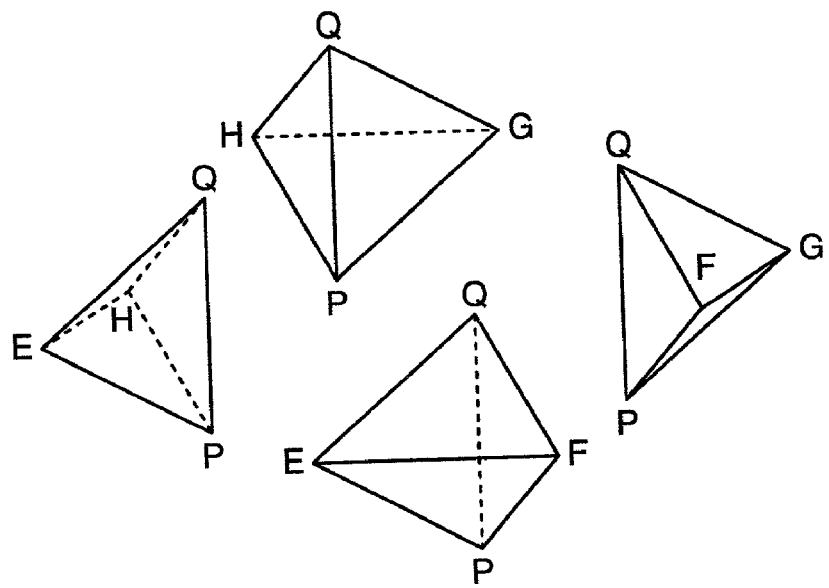
Figure 5:
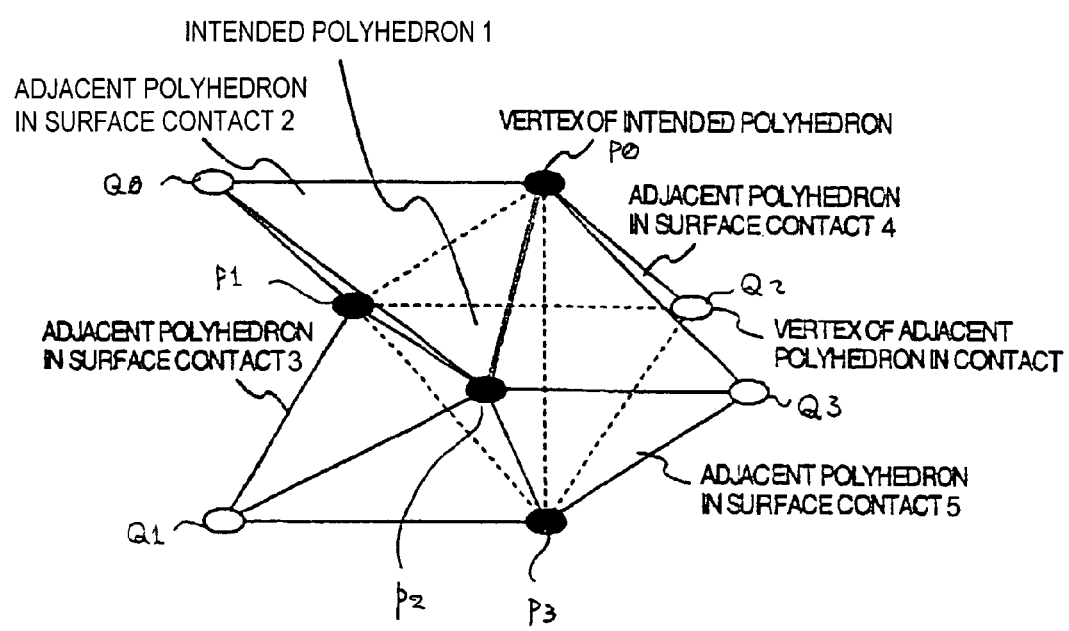
FIG. 5 is a diagram for explaining the interpolation for the method and the apparatus for three-dimensional signal conversion according to the second embodiment of the present invention.
Figure 6A:
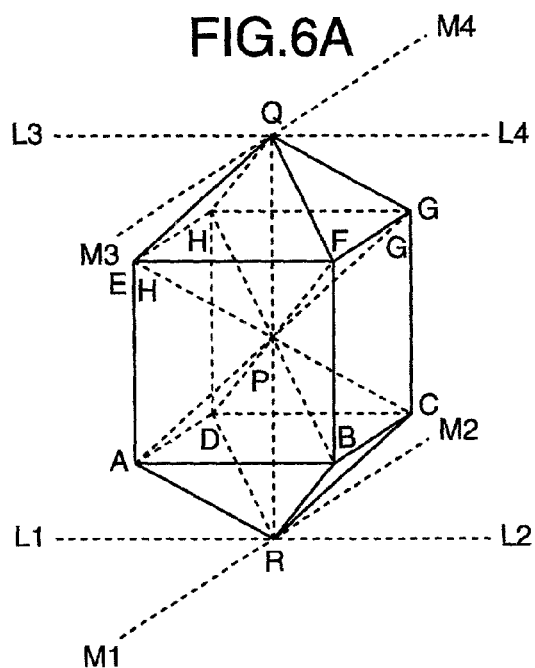
FIGS. 6A–6C are diagrams for explaining the division into tetrahedrons for the method and the apparatus for three-dimensional signal conversion according to the second embodiment of the present invention.
Figure 6B:
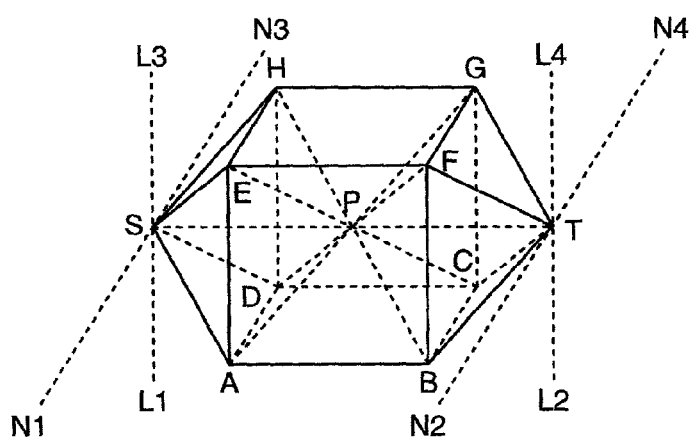
Figure 6C:
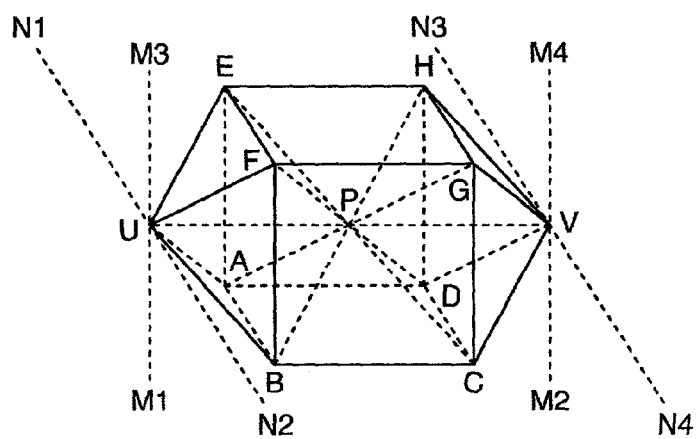
Figure 7:
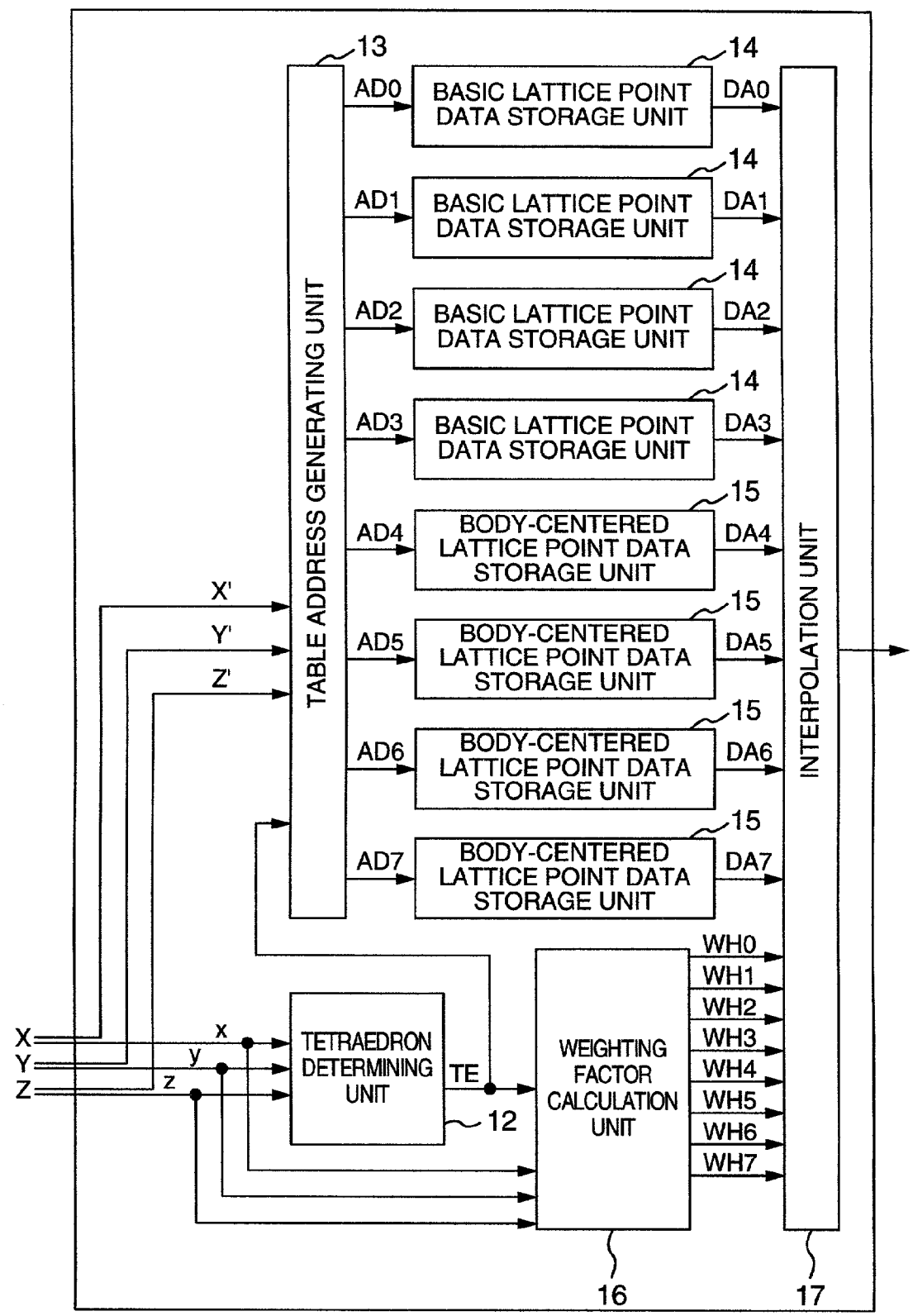
FIG. 7 is a diagram showing a configuration for the method and the apparatus for three-dimensional signal conversion according to the second embodiment of the present invention.

FIGS. 4A–4C are diagrams for explaining body-centered lattice points and division into tetrahedrons in a method and an apparatus for three-dimensional signal conversion according to a second embodiment of the present invention. FIG. 5 is a diagram for explaining the interpolation in the method and the apparatus for three-dimensional signal conversion according to the second embodiment of the present invention. FIGS. 6A–6C are diagrams for explaining the division into tetrahedrons in the method and the apparatus for three-dimensional signal conversion according to the second embodiment of the present invention. FIG. 7 is a diagram showing the configuration of the method and the apparatus for three-dimensional signal conversion according to the second embodiment of the present invention. FIG. 8 is a diagram showing the configuration of lattice point data in the method and the apparatus for three-dimensional signal conversion according to the second embodiment of the present invention.

FIGS. 4A–4C show the division into tetrahedrons according to the present invention. In the three-dimensional-table interpolation method described with reference to the prior art, the unit cube ABCDEFGH and the unit cube EFGHIJKL will be considered.

The body-centered lattice points of the unit cubes ABCDEFGH and EFGHIJKL are assumed to be "P" and "Q", respectively. As shown in FIGS. 4A–4C, octahedron EFGHQP is cut out and is divided into four tetrahedrons FEQP, FGQP, HGQP, and HEQP. According to the present invention, the octahedron is divided into tetrahedrons having vertices at the two body-centered lattice points of two adjacent unit cubes and two adjacent basic lattice points located in the boundary between the two unit cubes.

FIG. 5 shows the general method according to the present invention. In this method, the data in the intended polyhedron 1 are nonlinealy interpolated using the tertiary function based on the values of a total of eight vertices including the four vertices (P0 to P3) of the intended polyhedron 1 and one each of the vertices (Q0 to Q3) not shared by the intended polyhedron, of the four tetrahedrons (2 to 5) in surface contact with the intended polyhedron.

In FIGS. 4A–4C, the octahedron EFGHQP formed by the upper unit cube EFGHIJKL adjacent to the unit cube ABCDEFGH is considered. Actually, however, as shown in FIGS. 6A–6C, six octahedrons ABCDRP, EFGHQP, ADHESP, BCGFTP, ABFEUP, and CDHGVP exist vertically, laterally and longitudinally adjacent to the unit cube ABCDEFGH. Each of these octahedrons is divided into four tetrahedrons for a total of 24 including ABRP, CBRP, CDRP, ADRP, FEQP, FGQP, HGQP, HEQP, ADSP, HDSP, HESP, AESP, CBTP, CGTP, FGTP, FBTP, ABUP, FBUP, FEUP, AEUP, CDVP, CGVP, HGVP, and HDVP.

Every point in the unit cube ABCDEFGH belongs to one of the 24 tetrahedrons. A rule is established to determine one of the tetrahedrons to which a given boundary of a given tetrahedron belongs.

FIGS. 6A–6C show the lattice points outside of the tetrahedrons. As new external bodycentered lattice points, L1–L4, M1–M4, and N1–N4 are determined.

FIG. 7 is a diagram showing the configuration of the first signal conversion unit according to the present invention. A tetrahedron determining unit 12 determines a particular tetrahedron to which each point to be specified belongs. A table address generating unit 13 calculates address signals AD0–AD7 of the internal and external vertices of the tetrahedron thus determined. Four basic lattice point data storage units 14 and four body-centered lattice point data storage units 15 output eight data DA0–DA7 for the particular tetrahedron from the address signals AD0–AD7.

A weighting-factor calculation unit 16 calculates weighting factors WH0–WH7 of the eight internal and external vertices of the tetrahedron with the data specified on the points to be interpolated. An interpolation unit 17 interpolates data DA on each point to be determined, based on the data DA0–DA7 on the eight internal and external points, and the weighting factors WH0–WH7 for the tetrahedron.

Now, the configuration and operation of the second signal conversion unit will be described in detail.

In FIG. 7, three 8-bit input signals X, Y, and Z are each divided into the most significant 4-bit signals X', Y', and Z', and the least significant signals x, y, and z. The least significant bit signals x, y, and z are input to the tetrahedron determining unit 12, while the most significant 4-bit signals X', Y', and Z' are input to the table address generating unit 13. By way of explanation, according to the present invention, the input signal is assumed to be a fixed point number, the most significant 4 bits represent an integer, and the least significant 4 bits represent a decimal number.

The tetrahedron determining unit 12 determines that one of the 24 tetrahedrons formed of the vertices shown in Table 1 to which the points to be determined in the unit cube belong. This determination is carried out from whether the six related equations y−x, y+x−1, z−x, z+x−1, z−y, z+y−1 of the least significant 4-bit signals x, y, and z shown in Table 2 are positive (+) or negative (−). The result of determination is output as a 5-bit tetrahedron determination signal TE together with the least significant 4 bits x, y, and z. In the case where the value of the related equations is zero, however, the determination is open, but in such a case, the result of determination is assumed to be positive (+) for the present purpose.

TABLE 2-continued

| TETRA-HEDRON | TETRA-HEDRON NO. TE | DETERMINING EQUATIONS | | | | | |
|---|---|---|---|---|---|---|---|
| | | y − x | y + x − 1 | z − x | z + x − 1 | z − y | z + y − 1 |
| AESP | 11 | + | − | + | − | + | − |
| CBTP | 12 | − | + | − | + | − | − |
| CGTP | 13 | − | + | − | + | − | + |
| FGTP | 14 | − | + | − | + | + | + |
| FBTP | 15 | − | + | − | + | + | − |
| ABUP | 16 | − | − | − | − | + | − |
| FBUP | 17 | − | − | − | + | + | − |
| FEUP | 18 | − | − | + | + | + | − |
| AEUP | 19 | − | − | + | − | + | − |
| CDVP | 20 | + | + | − | − | − | + |
| CGVP | 21 | + | + | − | + | − | + |
| HGVP | 22 | + | + | + | + | − | + |
| HDVP | 23 | + | + | + | − | − | + |

TABLE 1

| Tetra-hedron | Tetra-hedron No. TE | Boundary basic lattice point AD0 | Boundary basic lattice point AD1 | Boundary body-centered lattice point AD2 | Boundary body-centered lattice point AD3 | External basic lattice point AD4 | External basic lattice point AD5 | External body centered lattice point AD6 | External body centered lattice point AD6 |
|---|---|---|---|---|---|---|---|---|---|
| ABRP | 0 | A | B | R | P | C | D | U | M1 |
| CBRP | 1 | C | B | R | P | A | D | T | L2 |
| CDRP | 2 | C | D | R | P | A | B | V | M2 |
| ADRP | 3 | A | D | R | P | C | B | S | L1 |
| FEQP | 4 | F | E | Q | P | H | G | U | M3 |
| FGQP | 5 | F | G | Q | P | H | E | T | L4 |
| HGQP | 6 | H | G | Q | P | F | E | V | M4 |
| HEQP | 7 | H | E | Q | P | F | G | S | L3 |
| ADSP | 8 | A | D | S | P | H | E | Q | L1 |
| HDSP | 9 | H | D | S | P | A | E | V | N3 |
| HESP | 10 | H | E | S | P | A | D | R | L3 |
| AESP | 11 | A | E | S | P | H | D | U | N1 |
| CBTP | 12 | C | B | T | P | F | G | Q | L2 |
| CGTP | 13 | C | G | T | P | F | B | V | N4 |
| FGTP | 14 | F | G | T | P | C | B | R | L4 |
| FBTP | 15 | F | B | T | P | C | G | U | N2 |
| ABUP | 16 | A | B | U | P | F | E | Q | M1 |
| FBUP | 17 | F | B | U | P | A | E | T | N2 |
| FEUP | 18 | F | E | U | P | A | B | R | M3 |
| AEUP | 19 | A | E | U | P | F | B | S | N1 |
| CDVP | 20 | C | D | V | P | H | G | Q | M2 |
| CGVP | 21 | C | G | V | P | H | D | T | N4 |
| HGVP | 22 | H | G | V | P | C | D | R | M4 |
| HDVP | 23 | H | D | V | P | C | G | S | N3 |

TABLE 2

| TETRA-HEDRON | TETRA-HEDRON NO. TE | DETERMINING EQUATIONS | | | | | |
|---|---|---|---|---|---|---|---|
| | | y − x | y + x − 1 | z − x | z + x − 1 | z − y | z + y − 1 |
| ABRP | 0 | − | − | − | − | − | − |
| CBRP | 1 | − | + | − | − | − | − |
| CDRP | 2 | + | + | − | − | − | − |
| ADRP | 3 | + | − | − | − | − | − |
| FERP | 4 | − | − | + | + | + | + |
| FGRP | 5 | − | + | + | + | + | + |
| HGRP | 6 | + | + | + | + | + | + |
| HERP | 7 | + | − | + | + | + | + |
| ADSP | 8 | + | − | + | − | − | − |
| HDSP | 9 | + | − | + | − | − | + |
| HESP | 10 | + | − | + | − | + | + |

Based on the most significant 4-bit signals X', Y', and Z' of the input signal and the tetrahedron determining signal TE, the table address generating unit 13 outputs the addresses of the eight lattice points related to the intended tetrahedron.

The addresses of the eight lattice points related to the intended tetrahedron include the addresses AD0 and AD1 of two internal basic lattice points, the addresses AD2 and AD3 of two internal body-centered lattice points, the addresses AD4 and AD5 of two external basic lattice points, and the addresses AD6 and AD7 of two external body-centered lattice points. These addresses assume those of the lattice points shown in Table 3 in accordance with the tetrahedron determination signal TE.

TABLE 3

| TYPE OF LATTICE POINT | LATTICE POINT | LATTICE POINT DATA ADDRESS | | |
|---|---|---|---|---|
| | | I | J | K |
| BASIC LATTICE POINT | A | i | j | k |
| | B | i + 1 | j | k |
| | C | i + 1 | j + 1 | k |
| | D | i | j + 1 | k |
| | E | i | j | k + 1 |
| | F | i + 1 | j | k + 1 |
| | E | i + 1 | j + 1 | k + 1 |
| | G | i | j + 1 | k + 1 |
| BODY-CENTERED LATTICE POINT | P | i + 1 | j + 1 | k + 1 |
| | Q | i + 1 | j + 1 | k |
| | R | i + 1 | j + 1 | k + 2 |
| | S | i | j + 1 | k + 1 |
| | T | i + 2 | j + 1 | k + 1 |
| | U | i + 1 | j | k + 1 |
| | V | i + 1 | j + 2 | k + 1 |
| | L1 | i | j + 1 | k |
| | L2 | i + 2 | j + 1 | k |
| | L3 | i | j + 1 | k + 2 |
| | L4 | i + 2 | j + 1 | k + 2 |
| | M1 | i + 1 | j | k |
| | M2 | i + 1 | j + 2 | k |
| | M3 | i + 1 | j | k + 2 |
| | M4 | i + 1 | j + 2 | k + 2 |
| | N1 | i | j | k + 1 |
| | N2 | i | j + 2 | k + 1 |
| | N3 | i + 2 | j | k + 1 |
| | N4 | i + 2 | j + 2 | k + 1 |

The address of the lattice point is configured of $X''_n$, $Y''_n$, and $Z''_n$ (n=0, 1, 2, 3) generated by the calculations shown in Table 3 based on the most significant 4-bit signals X', Y', and Z' of the input signal.

By the processing described above, the lattice point addresses AD0–AD7 are generated, and are input to the four basic lattice point data storage units 14 and the four body-centered lattice point data storage units 15, respectively.

The basic lattice point data storage units 14 and the body-centered lattice point data storage units 15 are configured of a semiconductor memory. When the address signals AD0–AD7 are input to the basic lattice point data storage units 14 and the body-centered lattice point data storage units 15, the data DA0–DA7 corresponding to the particular addresses are read out. The data of the basic lattice point data storage units 14 and the body-centered lattice point data storage units 15 are stored in the manner as shown in FIG. 8. The basic lattice point addresses correspond to the coordinates of the basic lattice points. The body-centered lattice point addresses, however, though they correspond to the coordinates of the body-centered points, assume the values of X+0.5, Y+0.5, and Z+0.5. The output signals DA0–DA7 of the basic lattice point data storage units 14 and the body-centered lattice point data storage units 15 represent the vertices related to the intended tetrahedron, and are sent to the interpolation units 17.

The weighting factor calculation unit 16 determines the weighting factors WH0–WH7 based on the least significant 4-bit signals x, y, and z, and the tetrahedron determining signal TE from the tetrahedron determining unit 12. The specific weighting factors WH0–WH7 are shown in Table 4, in which the h(t) function is the interpolation function already shown in Equation 2 above.

TABLE 4

| TETRA-HEDRON | TETRA-HEDRON NO. TE | BOUNDARY BASIC LATTICE POINT WEIGHTING FACTOR WH0 | BOUNDARY BASIC LATTICE POINT WEIGHTING FACTOR WH1 | BOUNDARY BODY-CENTERED LATTICE POINT WEIGHTING FACTOR WH2 | BOUNDARY BODY-CENTERED LATTICE POINT WEIGHTING FACTOR WH3 | EXTERNAL BASIC LATTICE POINT WEIGHTING FACTOR WH4 | EXTERNAL BASIC LATTICE POINT WEIGHTING FACTOR WH5 | EXTERNAL BODY CENTERED LATTICE POINT WEIGHTING FACTOR WH6 | EXTERNAL BODY CENTERED LATTICE POINT WEIGHTING FACTOR WH7 |
|---|---|---|---|---|---|---|---|---|---|
| ABRP | 0 | h(x + y) | h(1 − x + y) | h(1 − y + z) | h(1 − y − z) | h(2 − x − y) | h(x − y + 1) | h(1 + y − z) | h(1 + y + z) |
| CBRP | 1 | h(2 − x − y) | h(1 − x + y) | h(x + z) | h(x − z) | h(x + y) | h(x − y + 1) | h(2 − x − z) | h(2 − x + z) |
| CDRP | 2 | h(2 − x − y) | h(1 + x − y) | h(y + z) | h(y − z) | h(x + y) | h(1 − x + y) | h(2 − y − z) | h(2 − y + z) |
| ADRP | 3 | h(x + y) | h(1 + x − y) | h(1 − x + z) | h(1 − x − z) | h(2 − x − y) | h(1 − x + y) | h(1 + x − z) | h(1 + x + z) |
| FERP | 4 | h(1 − x + y) | h(x + y) | h(2 − y − z) | h(z − y) | h(x − y + 1) | h(2 − x − y) | h(y + z) | h(2 − z + y) |
| FGRP | 5 | h(1 − x + y) | h(2 − x − y) | h(1 + x − z) | h(x + z − 1) | h(x − y + 1) | h(x + y) | h(1 − x + z) | h(3 − x − z) |
| HGRP | 6 | h(1 + x − y) | h(2 − x − y) | h(1 + y − z) | h(y + z − 1) | h(1 − x + y) | h(x + y) | h(1 − y + z) | h(3 − y − z) |
| HERP | 7 | h(1 + x − y) | h(x + y) | h(2 − x − z) | h(z − x) | h(1 − x + y) | h(2 − x − y) | h(x + z) | h(2 + x − z) |
| ADSP | 8 | h(y + z) | h(1 − y + z) | h(1 + x − z) | h(1 − x − z) | h(2 − y − z) | h(1 + y − z) | h(1 − x + z) | h(1 + x + z) |
| HDSP | 9 | h(2 − y − z) | h(1 − y + z) | h(x + y) | h(y − x) | h(y + z) | h(1 + y − z) | h(2 − x − y) | h(2 + x − y) |
| HESP | 10 | h(2 − y − z) | h(1 + y − z) | h(x + z) | h(z − x) | h(y + z) | h(1 − y + z) | h(2 − x − z) | h(2 + x − z) |
| AESP | 11 | h(y + z) | h(1 + y − z) | h(1 + x − y) | h(1 − x − y) | h(2 − y − z) | h(1 − y + z) | h(1 − x + y) | h(1 + x + y) |
| CBTP | 12 | h(1 − y + z) | h(y + z) | h(2 − x − z) | h(x − z) | h(1 + y − z) | h(2 − y − z) | h(x + z) | h(2 − x + z) |
| CGTP | 13 | h(1 − y + z) | h(2 − y − z) | h(1 − x + y) | h(x + y − 1) | h(1 + y − z) | h(y + z) | h(x − y + 1) | h(3 − x − y) |
| FGTP | 14 | h(1 + y − z) | h(2 − y − z) | h(1 − x + z) | h(x + z − 1) | h(1 − y + z) | h(y + z) | h(1 + x − z) | h(3 − x − z) |
| FBTP | 15 | h(1 + y − z) | h(y + z) | h(2 − x − y) | h(x − y) | h(1 − y + z) | h(2 − y − z) | h(x + y) | h(2 − x + y) |
| ABUP | 16 | h(x + z) | h(1 − x + z) | h(1 + y − z) | h(1 − y − z) | h(2 − x − z) | h(1 + x − z) | h(1 − y + z) | h(1 + y + z) |
| FBUP | 17 | h(2 − x − z) | h(1 − x + z) | h(x + y) | h(x − y) | h(x + z) | h(1 + x − z) | h(2 − x − y) | h(2 − x + y) |
| FEUP | 18 | h(2 − x − z) | h(1 + x − z) | h(y + z) | h(z − y) | h(x + z) | h(1 − x + z) | h(2 − y − z) | h(2 − z + y) |
| AEUP | 19 | h(x + z) | h(1 + x − z) | h(1 − x + y) | h(1 − x − y) | h(2 − x − z) | h(1 − x + z) | h(x − y + 1) | h(1 + x + y) |
| CDVP | 20 | h(1 − x + z) | h(x + z) | h(2 − y − z) | h(y − z) | h(1 − x + z) | h(2 − x − z) | h(y + z) | h(2 − y − z) |
| CGVP | 21 | h(1 − x + z) | h(2 − x − z) | h(1 + x − y) | h(x + y − 1) | h(1 + x − z) | h(x + z) | h(1 − x + y) | h(3 − x − y) |
| HGVP | 22 | h(1 + x − z) | h(2 − x − z) | h(1 − y + z) | h(y + z − 1) | h(1 − x + z) | h(x + z) | h(1 + y − z) | h(3 − y − z) |
| HDVP | 23 | h(1 + x − z) | h(x + z) | h(2 − x − y) | h(y − x) | h(1 − x + z) | h(2 − x − z) | h(x + y) | h(2 + x − y) |

The interpolation processing unit 17 calculates the product of sums as shown in Equation 5 based on the vertex data DA0–DA7 from the four basic lattice point data storage units 14 and the four body-centered lattice point data storage units 15 and the weighting factors WH0–WH7 from the weighting factor calculation unit 16.

$$DA=DA0 \cdot WH0+DA1 \cdot WH1+DA2 \cdot WH2+DA3 \cdot WH3+ \\ DA6 \cdot WH6+DA6 \cdot WH6+DA6 \cdot WH6+DA6 \cdot WH7 \quad \text{(Equation 5)}$$

Figure 9:
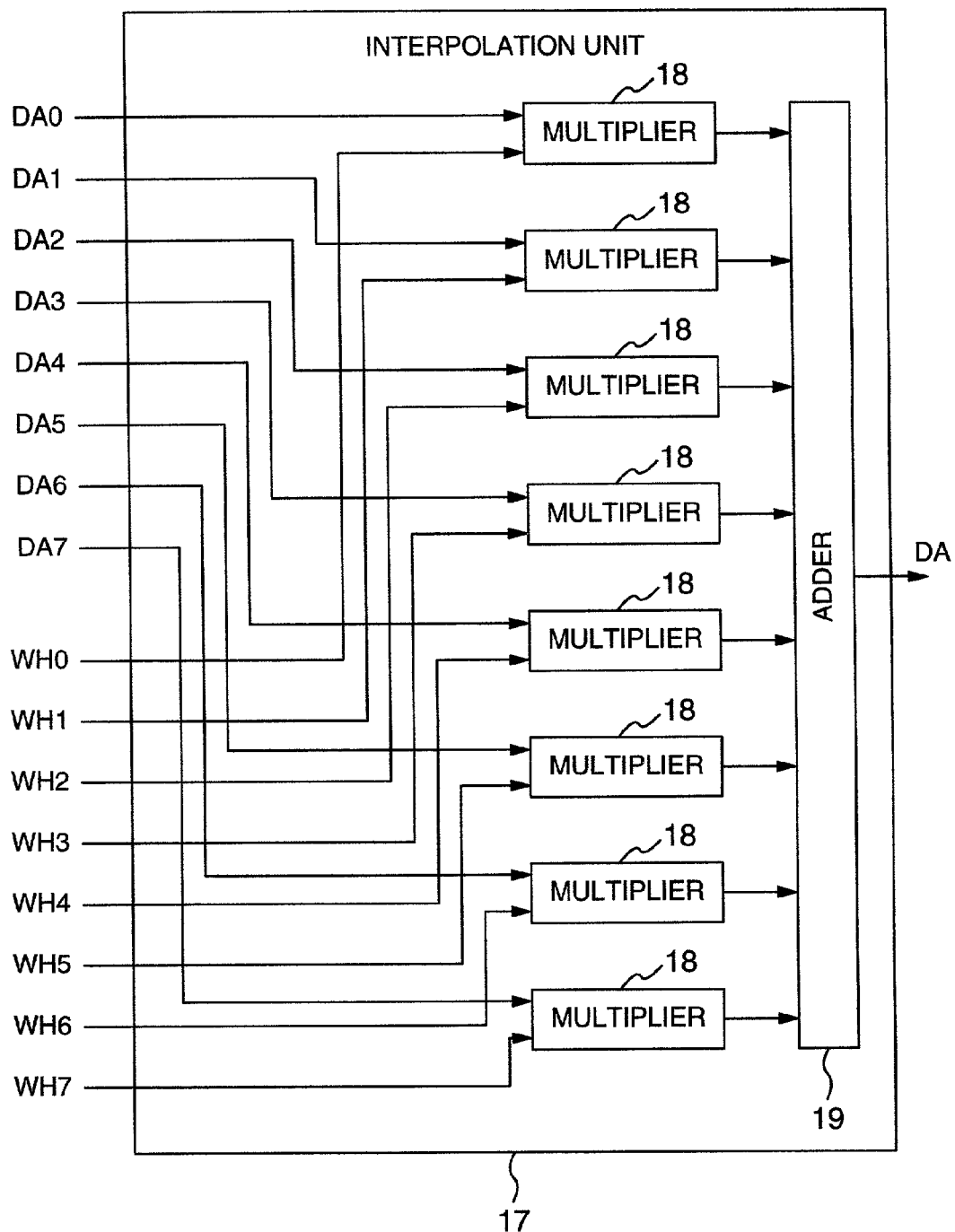
FIG. 9 is a diagram showing the configuration of interpolation means for the method and the apparatus for three-dimensional signal conversion according to the second embodiment of the present invention.

FIG. 9 is a diagram showing the configuration of the interpolation unit for the method and the apparatus for three-dimensional signal conversion according to the second embodiment of the present invention, and specifically represents the configuration of the interpolation processing unit 17. The products of the vertex data and the corresponding weighting factors are determined in eight multipliers 18. The sum of the respective products is produced in the adder 19. In this way, the internal data of the tetrahedron are determined by nonlinear interpolation using the tertiary function, and the conversion signal DA is output.

It will thus be understood from the foregoing description that according to the present invention, there are provided the method and the apparatus for three-dimensional signal conversion in which the high-accuracy conversion value for smooth interpolation can be obtained with a small number of lattice points referred to and a small amount of calculations for the interpolation processing in color conversion of the color image.

What is claimed is:

1. A three-dimensional signal conversion method for generating different output signals from three-channel input signals by interpolation of a plurality of conversion data, the method comprising:

dividing a three-dimensional space formed by said three-channel input signals into a plurality of polyhedrons having vertices at points corresponding to addresses of a conversion table;

determining an intended polyhedron that is associated with a point corresponding to one of said three-channel input signals; and carrying out nonlinear interpolation using (i) conversion data corresponding to vertices of the intended polyhedron and (ii) conversion data corresponding to at least one vertex of at least one of said polyhedrons in surface contact with said intended polyhedron, wherein said at least one vertex is a vertex that is not shared in common with said intended polyhedron.

2. A three-dimensional signal conversion method according to claim 1, wherein said conversion data correspond to basic-cubic lattice points of said three-dimensional space.

3. A three-dimensional signal conversion method according to claim 2, wherein said polyhedron is a unit cube having basic-cubic lattices.

4. A three-dimensional signal conversion method according to claim 1, wherein said conversion data correspond to body-centered-cubic lattice points of said three-dimensional space.

5. A three-dimensional signal conversion method according to claim 4, wherein said polyhedron is a tetrahedron having vertices at body-centered-cubic lattices points.

6. A three-dimensional signal conversion apparatus for generating different output signals from three-channel input signals by interpolation of a plurality of conversion data, the apparatus comprising:

a polyhedron determining section that divides a three-dimensional space formed by said three-channel input signals into a plurality of polyhedrons having vertices at points corresponding to addresses of a conversion table to determine an intended polyhedron that is associated with a point corresponding to one of said three-channel input signals;

a conversion data read section that reads (i) first conversion data corresponding to vertices of the intended polyhedron and (ii) second conversion data corresponding to at least one vertex of at least one of said polyhedrons in surface contact with said intended polyhedron, wherein said at least one vertex is a vertex that is not shared in common with said intended polyhedron;

a weighting-factor calculation section that calculates weighting factors corresponding to said read first and second conversion data based on relative positions of points corresponding to said one of said three-channel input signals in said intended polyhedron; and a nonlinear interpolation section that carries out nonlinear interpolation using said read first and second conversion data and said weighting factors.

7. A three-dimensional signal conversion apparatus according to claim 6, wherein said conversion data read section divides said conversion data into a plurality of groups to read said first and second conversion data from said respective conversion data groups in parallel.

8. A three-dimensional signal conversion apparatus according to claim 6, wherein said nonlinear interpolation section includes a table of multiplication of said read first and second conversion data and said weighting factors.

* * * * *